Figure 2:
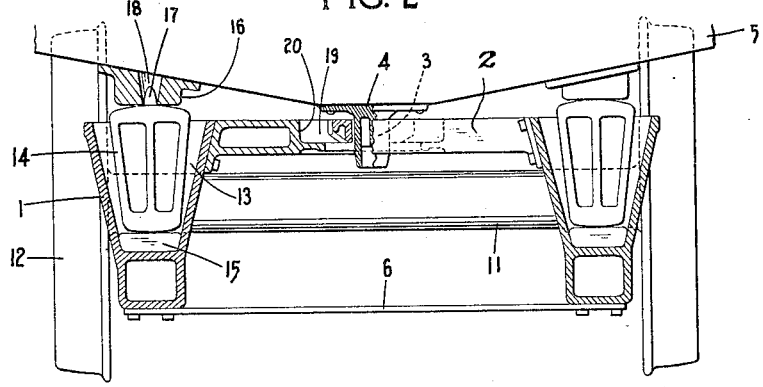

May 2, 1933.  P. R. DRENNING  1,907,384
INBOARD TRUCK WITH LATERAL MOTION MEANS
Filed Dec. 26, 1928

Inventor
Percy R. Drenning
By [signature]
[signature] Attorney

Patented May 2, 1933

1,907,384

UNITED STATES PATENT OFFICE

PERCY R. DRENNING, OF BALTIMORE, MARYLAND, ASSIGNOR TO T. H. SYMINGTON & SON, INC., OF BALTIMORE, MARYLAND, A CORPORATION OF MARYLAND

INBOARD TRUCK WITH LATERAL MOTION MEANS

Application filed December 26, 1928. Serial No. 328,551.

The invention relates to railway car trucks, particularly those of the inboard type, and has for its general object the provision of a novel inboard type truck having lateral motion means thereon.

An important object of the invention is to provide an inboard type truck of this character in which there is provided a unit consisting of side frames and a truck bolster, and a body bolster, both bolsters being capable of relative swivelling movement, and the latter being capable of lateral motion with respect to the side frames, rockers being provided for supporting the body bolster in such manner that it may have lateral motion during relative swivelling movement of the truck and body bolsters.

A more specific object of the invention is to provide an inboard type truck embodying these characteristics and in which the side bearing rockers, which support the body bolster, are located within the side frames.

Another specific object of the invention is to provide a railway car truck of the lateral motion type in which the side frames are formed with pockets within which are mounted rockers which support the body bolster sustaining the entire load.

Another object of the invention is to provide a railway car truck of the inboard type in which the truck bolster may be constructed simply as more or less of a truss-like member secured to and bridging the side frames, the latter containing side bearing means supporting the body bolster under normal conditions, when relative swivelling movement of the truck and body bolsters occurs, and when the body bolster moves laterally with respect to the side frames as is bound to occur when a car passes over curved track.

It might be stated at this point that there is no necessity for going at length into the advantages of a construction wherein lateral motion of the body bolster is permitted inasmuch as sufficient has been done in this art that the benefits are well recognized. However, it appears that trucks of the inboard type, that is to say in which the wheels are located outwardly beyond the journal boxes are of comparatively recent origin or at least development and it also appears that the application of the usual type of side bearing means permitting lateral motion in a truck of this type presents difficulties. However, my invention, in its broad aspect, comprises the provision of lateral motion means mounted in the side frames themselves, it being well understood that great strength will be attained by this particular arrangement and location as the thrust will come directly upon the wheels instead of a leverage being exerted as would occur if the side bearing rockers were mounted at any other location.

Another object of the invention is to provide a structure of this character which will be simple and inexpensive to manufacture, easy to install, positive in action, efficient and durable in service, and a general improvement in the art.

Figure 1:
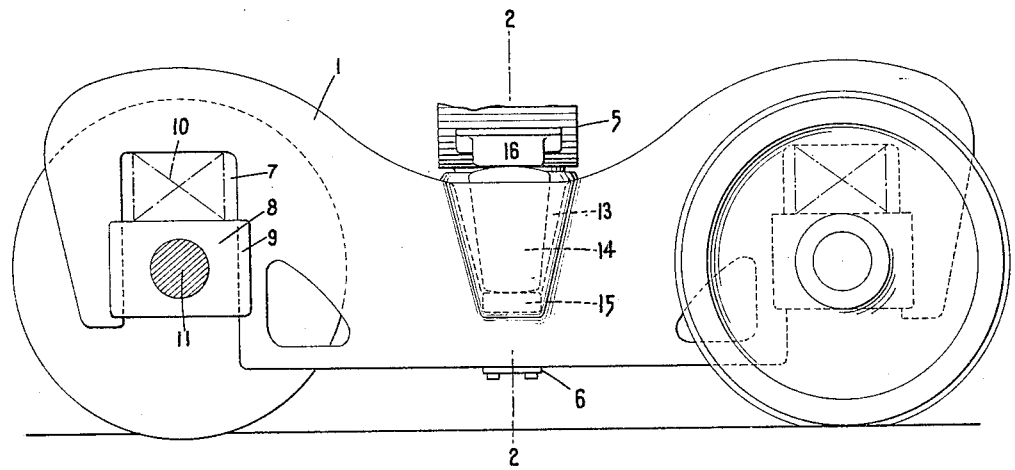

To the attainment of the foregoing and other objects and advantages, the invention preferably consists in the details of construction and the arrangement and combination of parts to be hereinafter more fully described and claimed, and illustrated in the accompanying drawing in which:

Figure 1 is a view partly in side elevation and partly in section showing a truck constructed in accordance with my invention, and Figure 2 is a substantially central vertical cross sectional view taken on the line 2—2 of Figure 1 with a portion of the truck bolster in elevation.

Referring more particularly to the drawing, I have shown the truck as comprising side frames 1 connected by a truss or bridge member 2 which constitutes, in effect, the truck bolster and which carries a center bearing or other guide device 3 which receives the depending center bearing 4 on the body bolster 5. The center bearing 3 has provision made in member 2 for lateral motion either way as indicated at 19. The lateral motion of member 3 may be limited by contact with face 20. The detailed construction of the bolster member 2 is rather immaterial and it is apparent that it may be secured to the side frames 1 in any preferred manner. For bracing purposes, I provide a bridge piece 100

6 or the like secured to the undersides of the side frames as shown. The side frames are each necessarily of special construction and are represented as having their ends formed with downwardly opening jaws 7 within which are vertically slidably mounted journal boxes or bearings 8 restrained against lateral displacement with respect to the side frames as by flanges 9 which project beyond the openings in the jaws and which are located either at the inner or outer faces of the side frames, this detail being immaterial. Spring means, illustrated diagrammatically at 10 in Figure 1, is mounted above each of the journal boxes or bearings 8 for providing the necessary resilience. This and any other spring means which may be needed for sustaining the weight of the car is not really a part of the invention and no additional disclosure thereof is made for this reason. Of course the car axles 11 pass through the journal boxes or bearings 8 and are equipped with the wheels 12 which, it will be observed, are located outwardly beyond the side frames. In many respects the side frames may be of the usual design but in accordance with the invention, I have shown them as formed at substantially their centers with pockets 13 which are preferably of inverted frusto-conical shape, at least roughly considered. These pockets may be very simply formed without sacrificing strength and may be made as large or as small as may be found advisable or necessary depending upon the character of the car beneath which the truck is to be used and also depending upon the exact size, shape and nature of the side bearing rockers.

Mounted within the pockets 13 are rockers 14 beneath which it is preferable to provide block-like bearing members 15 which are removable and which may be replaced if worn or which may be added to, by means of shims, for adjusting purposes. These rockers cooperate with bearing elements 16 depending from the underside of the body bolster 5. While it is more or less immaterial what the exact configuration of the upper and lower surfaces of the rockers may be, it is preferable that these surfaces be nearly spherical and that the upper ones be provided with upstanding spuds or teeth 17 received within openings 18 in the depending bearing elements 16. The openings 18 are preferably, though not necessarily, cardiac shaped as disclosed in the copending application of Thomas H. Symington, filed March 22nd, 1927, Serial No. 177,288 in order to prevent binding of the parts during relative swivelling movement of the bolsters at the same time that lateral motion of the body bolster occurs.

In the operation it will of course be apparent that the center bearing or guide 3 is of such construction and shape that the center plate 4 may move longitudinally of the truck bolster 2 so that the body bolster 5 may shift laterally with respect to the side frames when lateral shocks occur. When such lateral motion occurs the rockers 14 move correspondingly owing to the engagement of the spuds or teeth 17 within the openings 18. Relative swivelling of the truck and body bolsters occurs in the usual manner, this being permitted owing to the at least partially spherical shape of the upper and lower surfaces of the rockers. To render the structure more stable so that the body bolster will not be shifting about unnecessarily, it may be preferable to provide the top or the bottom surfaces, or both, of the rockers with flattened central areas as indicated for example in my co-pending application filed March 22nd, 1927, Serial No. 177,340. However, this and other refinements may be provided as may be found advisable in the actual commercial development of the invention.

In the use of a truck constructed in the manner disclosed it will be apparent that there will be great strength inasmuch as the weight, all of which comes upon the rockers, will be sustained directly by the side frames. Furthermore as the location of the rockers is at this point, substantially over the rails, there will be great stability and no danger of the car body rolling over especially in the event of a low spot in the track such as might be caused by a washout or the like. As the weight is borne by the side frames very little strain comes upon the truck bolster which may consequently be of very light construction especially as the bearing member 3 acts substantially only as a guide for the center bearing which depends from the body bolster. It will be apparent that no bending strains come upon the truck bolster. From the foregoing it is believed that the construction, operation and advantages will be readily apparent to one skilled in the art without further explanation.

While I have shown and described the preferred embodiment of the invention, it should be understood that the disclosure is merely an exemplification of the principles involved as the right is reserved to make all such changes in the details of construction as will widen the field of utility and increase the adaptability of the device provided such changes constitute no departure from the spirit of the invention or the scope of the claims hereunto appended.

Having thus described the invention, I claim:

1. In a railway car truck of the inboard type, side frames, a truck bolster connecting the side frames, a body bolster, means pivotally and slidably connecting the truck and body bolsters whereby they may have relative swivelling movement and whereby the latter may have lateral motion with respect to the side frames, side bearing rockers mounted within the side frames, and bearing elements depending from the body bolster and coacting with said side bearing means.

2. In a railway car truck, side frames located inwardly of the truck wheels, a truck bolster connecting the same, a body bolster, a slidable and pivotal connection between the truck and body bolsters whereby they may have relative swivelling movement and whereby the latter may have lateral motion with respect to the side frames, the side frames being formed with pockets, and side bearing rockers located within said pockets and supporting the body bolster.

3. In a railway car truck, side frames located inwardly of the truck wheels, a truck bolster connecting the same, a body bolster, coacting slidable and pivotal means on the truck and body bolsters whereby they may have relative swivelling movement and whereby the latter may have lateral motion with respect to the side frames, the side frames being formed with pockets having their maximum width at the top, side bearing rockers mounted within said pockets, and bearing elements depending from the body bolster and engaged upon and coacting with said rockers.

4. In a railway car truck of the inboard type, side frames, a truck bolster connecting the same, a body bolster, a guide on the truck bolster, a bearing slidable along said guide and pivotally connected with the body bolster whereby they may have relative swivelling movement and whereby the latter may have lateral motion with respect to the side frames, the side frames being formed with pockets enlarging upwardly, removable bearing blocks mounted within the bottom of said pockets, side bearing rockers mounted upon said blocks, and depending bearing elements elements on the body bolster engaged upon and coacting with said rockers.

5. In a railway car truck of the inboard type, side frames, a truck bolster connecting the same, a body bolster a pivotal and slidable connection between the truck and body bolsters whereby they may have relative swivelling movement and whereby the latter may have lateral motion with respect to the side frames, the side frames being formed with inverted frusto-conical pockets and being of rectangular box section therebeneath, removable bearing blocks mounted within the bottom of said pockets, side bearing rockers mounted upon said blocks, and depending bearing elements on the body bolster engaged upon and coacting with said rockers, the rockers having upstanding teeth, and said depending bearing elements having openings receiving said teeth.

6. In a railway car truck of the inboard type, side frames of the cast type formed centrally with inverted substantially frusto-conical pockets, an upper tie member secured to the inner faces of the side frames at the top of said pockets, a lower tie member secured to the bottoms of the side frames, a body bolster, a pivotal and slidable mounting on the upper tie member for the body bolster, depending bearing elements on the body bolster, and rockers located within said pockets and engaging against said depending bearing elements.

7. A railway car truck of the inboard type in which supporting springs are located at the journal boxes, comprising side frames of the cast steel type formed centrally with upwardly flaring pockets, a tie connecting the lower portions of the side frames, an upper tie connecting the upper portions of the side frames at their centers, a body bolster, a pivotal mounting for the body bolster slidable along said second named tie, bearing elements depending from the body bolsters, and rockers located within said pockets for supporting said bearing elements.

8. In a railway car truck, a side frame of the cast steel type formed with a pocket defined by upwardly diverging walls and adapted to receive a bearing rocker.

In testimony whereof I affix my signature.

PERCY R. DRENNING.